United States Patent
Wong et al.

(10) Patent No.: US 8,369,458 B2
(45) Date of Patent: Feb. 5, 2013

(54) WIRELESS RECEIVING SYSTEM WITH AN ADAPTIVELY CONFIGURABLE ANALOG TO DIGITAL CONVERTER

(75) Inventors: Louis Wong, Sunnyvale, CA (US); Chungwen Dennis Lo, Palo Alto, CA (US)

(73) Assignee: Ralink Technology Corporation, Hsinchu (TW)

( * ) Notice: Subject to any disclaimer, the term of this patent is extended or adjusted under 35 U.S.C. 154(b) by 746 days.

(21) Appl. No.: 11/961,964

(22) Filed: Dec. 20, 2007

(65) Prior Publication Data

US 2009/0161798 A1 Jun. 25, 2009

(51) Int. Cl.
*H04L 27/06* (2006.01)

(52) U.S. Cl. .................. 375/340; 340/870.21; 341/126; 341/155; 710/69

(58) Field of Classification Search .................. None
See application file for complete search history.

(56) References Cited

U.S. PATENT DOCUMENTS

| 6,686,860 B2* | 2/2004 | Gulati et al. | 341/155 |
| 2006/0126702 A1* | 6/2006 | Burdett | 375/136 |

FOREIGN PATENT DOCUMENTS

CN 1706107 A 12/2005

OTHER PUBLICATIONS

Gulati, Kush, et al., "A Low-Power Reconfigurable Analog-to-Digital Converter", IEEE Journal of Solid-State Circuits, Dec. 2001, vol. 36 No. 12, pp. 1900-1911.

* cited by examiner

*Primary Examiner* — David C. Payne
*Assistant Examiner* — Adolf Dsouza
(74) *Attorney, Agent, or Firm* — Sawyer Law Group, P.C.

(57) ABSTRACT

A circuit is disclosed that comprises a controller and an analog to digital converter (ADC) coupled to controller. The speed and/or the resolution of the ADC is configurable to provide optimum performance during the operation of the ADC. In an embodiment a wireless receiver with an adaptively configurable ADC for is provided. The speed and resolution the ADC is configurable depending on the operational mode of the receiver. Accordingly, through the use of an adaptively configurable ADC, power consumption and speed is optimized for each operational mode.

13 Claims, 6 Drawing Sheets

WIRELESS RECEIVING SYSTEM WITH AN ADAPTIVELY CONFIGURABLE ANALOG TO DIGITAL CONVERTER

FIELD OF THE INVENTION

The present invention relates generally to integrated circuits and more specifically to analog to digital circuits (ADCs) utilized in such circuits.

BACKGROUND OF THE INVENTION

Analog to digital converters (ADC) in wireless receiver circuits are often designed with specific and fixed requirements beforehand, such as conversion resolution and conversion speed for following digital signal processing. The ADC circuitry area and power consumption are typically determined from the architecture and design according to the resolution and speed requirements. Accordingly, the ADC is not optimized for power or performance. It is desirable to be able to utilize an ADC in a manner that allows an associated circuit to consume less power during idle operation, while also allowing the ADC to perform at a high rate, resolution or speed when the ADC is in use. The present invention addresses such a need.

SUMMARY OF THE INVENTION

A circuit is disclosed that comprises a controller and an analog to digital converter (ADC) coupled to a controller. The speed and/or the resolution of the ADC are configurable to provide optimum performance during the operation of the ADC.

In an embodiment a wireless receiver with an adaptively configurable ADC is provided. The speed and resolution the ADC is configurable depending on the operational mode of the receiver. Accordingly, through the use of an adaptively configurable ADC, power consumption and speed is optimized for each operational mode.

DETAILED DESCRIPTION OF PREFERRED EMBODIMENTS

The present invention relates generally to integrated circuits and more specifically to analog to digital circuits (ADC) utilized in such circuits. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A wireless receiver includes an analog to digital converter (ADC) which allows both configurable resolution and configurable speed is disclosed. The ADC is configured adaptively to the characteristic of the received data. For example, an ADC design can be configured as 10-bit 80 MHz, 10-bit 40 MHz, 7-bit 80 MHz or 7-bit 40 MHz operations. In early packet data detection or in low data rate, the ADC can be configured to low resolution or low speed and thus low power consumption. While in high data rate, the ADC can be configured to higher resolution and higher speed accordingly. These different modes of operation within ADC can be programmed instantly within a system to adapt to the system requirement for power optimization. To describe the features of the present invention in more detail, refer now to the following description in conjunction with the accompanying Figures.

Figure 1:
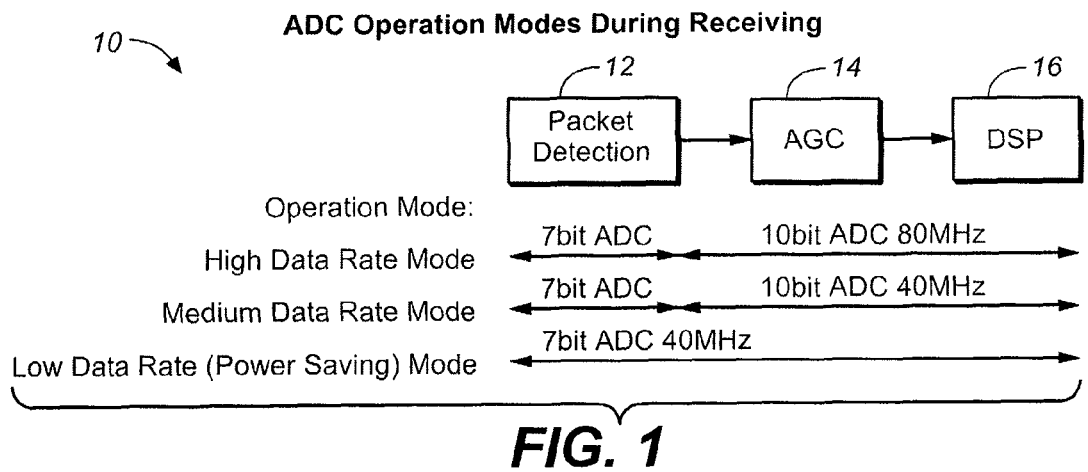
FIG. 1 illustrates the operation of an analog to digital converter (ADC) in a wireless receiver application.

FIG. 1 illustrates the operation of an analog to digital conversion (ADC) 10 in a wireless receiver. In this embodiment, once a packet is detected by packet detector 12 through packet correlation, the signal strength is optimized by an automatic gain control (AGC) mechanism 14 before reaching baseband digital signal process 16. In the initial packet detection, the ADC 10 is configured to the lowest resolution and lowest speed for power saving. Accordingly in accordance with an embodiment once a packet is detected, the ADC is configured instantly (in the range of logic gate transition time which is about <1 ns) to high, medium, or low resolution and speed depending on data rate requirement.

In an embodiment, the ADC could operate for the data rates high, medium and low, and the ADC could also operate in a packet detect mode. These data rates and mode will be described hereinbelow.

High data rate. At this rate, the system is operating at its maximum performance. In an embodiment, a high resolution (10-bit 80 MHz) ADC is selected since it provides highest resolution and fastest conversion speed. A low resolution ADC (a 7 bit ADC) may be utilized in a listening mode.

Medium data rate. At this data rate, in an embodiment, a medium resolution ADC (10-bit 40 MHz ADC) is selected. The ADC power consumption is lowered as the trade off of data rate. Once again a 7 bit ADC may be utilized in the listening mode.

Low data rate. At this rate, in an embodiment, a low resolution ADC (the 7-bit 40 MHz ADC) is always selected. The ADC power consumption is at minimum to maximize battery life.

Packet detection. In this mode, the lowest resolution and lowest speed ADC such as 7-bit 40 MHz ADC is selected. The ADC power consumption is at minimum to maximize battery life. A configurable ADC in accordance with the present invention could be implemented in a variety of ways. The following will describe two embodiments of a configurable ADC.

Figure 2:
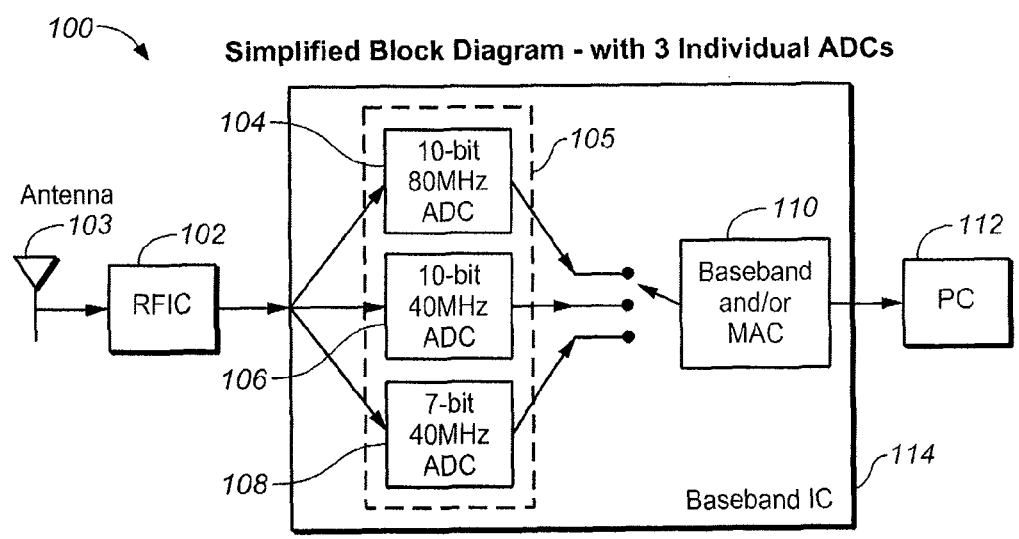
FIG. 2 shows a simplified block diagram of a first embodiment of a wireless local area network (LAN) system, includes three fixed ADCs.

FIG. 2 shows a simplified block diagram of a first embodiment of a wireless local area network (LAN) system 100 which includes a configurable ADC system 101. The system 100 comprises an antenna 103 which feeds into a radio frequency integrated circuit (RFIC) 102. The RFIC 102 feeds into a plurality of ADCs, for example, a 10-bit 80 MHz ADC 104, a 10-bit 40 MHZ ADC 106, and a 7-bit 40 MHz ADC 108). Although three ADCs are shown in this Figure, one of ordinary skill in the art readily recognizes there could be any number of ADCs greater than two and that number would be within the spirit and scope of the present invention. Each of the 104, 106 and 108 feeds ADC into the baseband and/or media access controller (MAC) 110, and the MAC 110 feeds into the personal computer (PC) 112.

Only one ADC is selected at any given time depending on the wireless receiver 100 operating modes described earlier. Although ADC system 105 is effective for its stated purpose, this approach would require a large silicon area and thus results in a lower wafer yield. Accordingly, it is desirable to provide a configurable ADC that does not have above-mentioned shortcomings.

Figure 3:
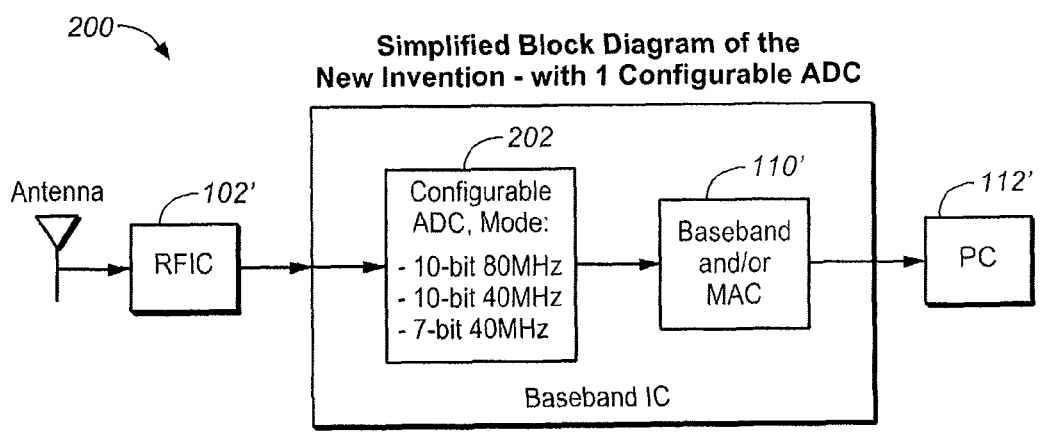
FIG. 3 shows a simplified block diagram of a second embodiment of this wireless LAN system, which includes a configurable ADC.

FIG. 3 shows a simplified block diagram of another embodiment of this wireless LAN system 200 which includes a configurable ADC 202. Instead of individual ADCs, a single configurable ADC 202 is used. First, the signal is received through the antenna, and then it is forwarded to the RFIC 102'. Then a single configurable ADC 202 is used. At the highest level, a high 10-bit 80 MHz ADC signal is used. At the medium level, an 10-bit 40 MHz ADC signal is used. At the lowest level, a 7-bit 40 MHz ADC signal is used. The application signal from the ADC 202 is then fed to a baseband and/or the MAC 110', and out to the PC 112'. Therefore, in this embodiment, the silicon area is significantly reduced, and power consumption is optimized for each operating mode, since there is a single ADC 202.

To describe the implementation of FIG. 3 in more detail, refer now to the following.

Figure 4:
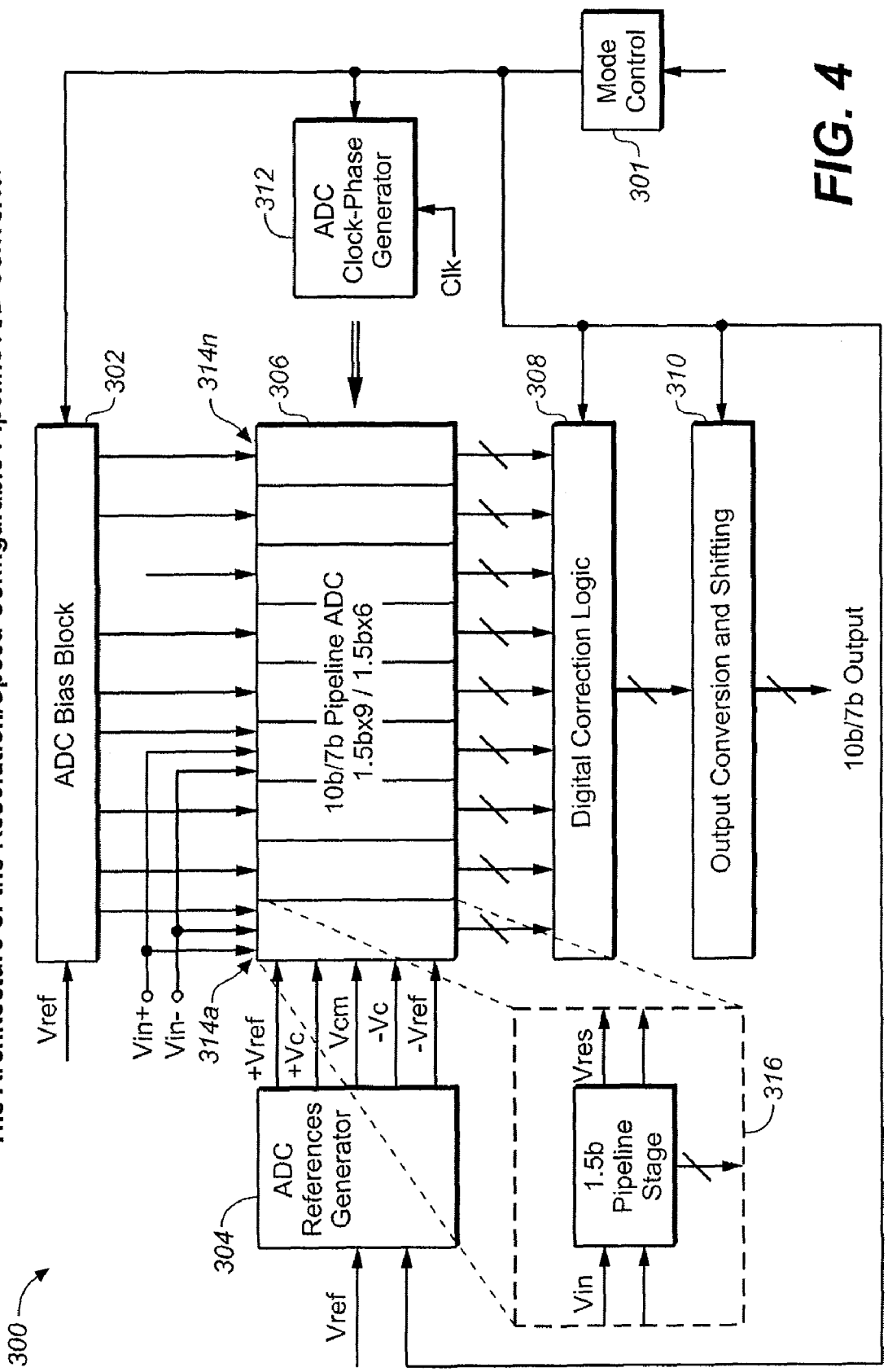
FIG. 4 shows an embodiment of a resolution and speed configurable ADC.

FIG. 4 shows an embodiment of a resolution and speed configurable ADC. In this embodiment, the ADC 300 may be, for example, a multi-stack ADC. In this embodiment, the ADC 300 comprises ADC reference generator 304, ADC bias block 302, and ADC Clock-Phase generator 312 all feed into a 10b/7b Pipeline ADC (i.e., the 10b/7b Pipeline ADC) 306. The ADC pipeline 306 includes a plurality of stages 314a-314n. Digital correction logic 308 receives the output from the pipeline ADC 306, and then an output signal is converted and shifted by the circuit 310. Finally an output signal is circuited provided from circuit 310. The various elements of the ADC 300 are controlled by mode control 301 to allow for configurability of the ADC. One of ordinary skill in the art readily recognizes the ADC, although a pipeline ADC is disclosed, the ADC could be any type of ADC, that would be within the spirit and scope of the present invention. For example, although a multi-stage pipeline 306 ADC is shown, the ADC could be other types, including but not limited to sigma delta ADC, success approximation ADC, flash ADC. To describe the configurability of the ADC 300, refer now to the following.

Figure 5:
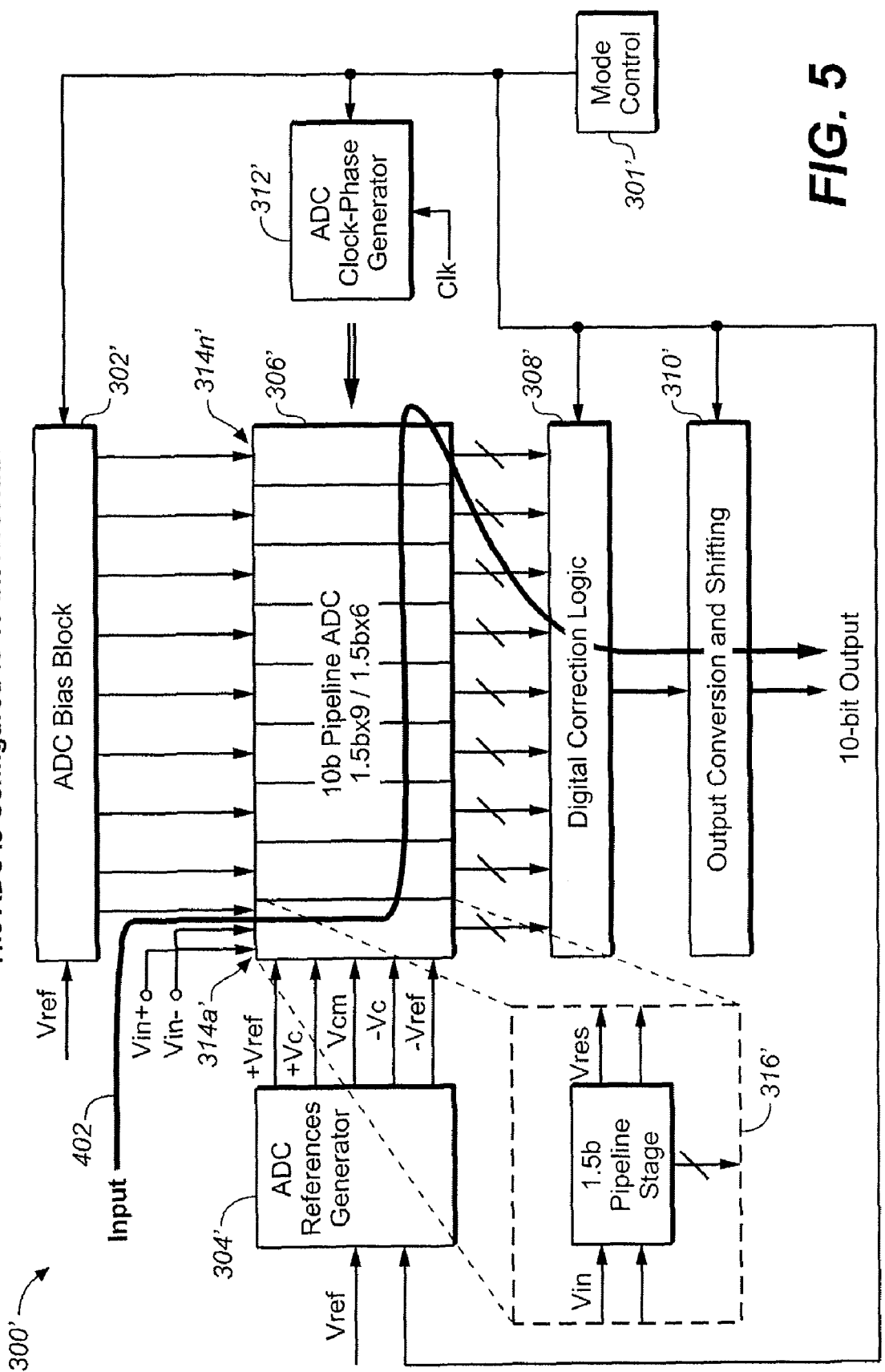
FIG. 5 shows the ADC configured to a high resolution (i.e., 10 bit resolution).

FIG. 5 shows the ADC 300 configured to a high resolution (i.e., 10 bit resolution). At this resolution, all of the stages 314a-314n of ADC 300' are fully turned-on and operational. The analog input is being processed by every stage 314 of the pipeline ADC 300 and digitized to convert the input to a 10-bit digital output.

Figure 6:
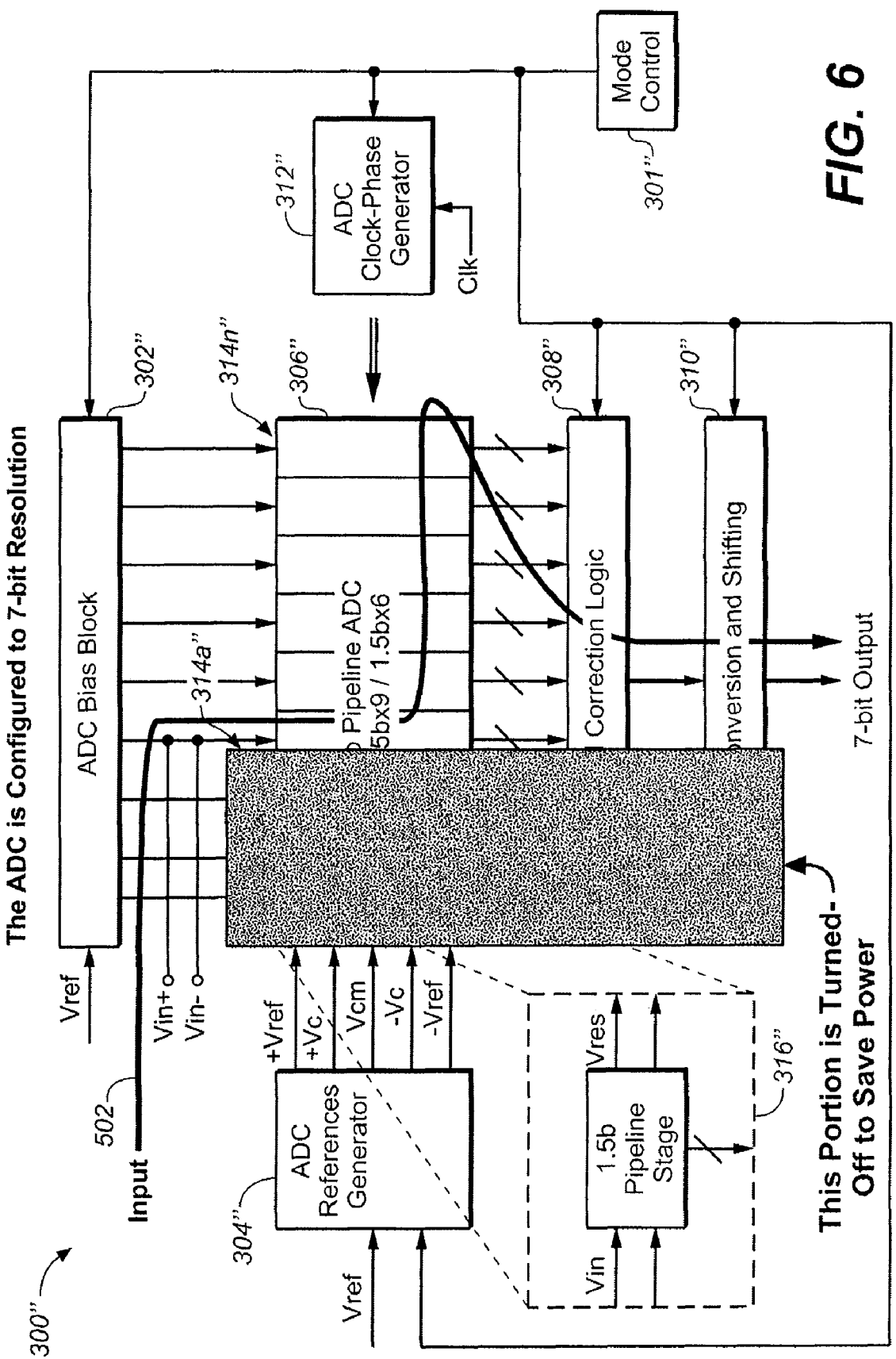
FIG. 6 shows the ADC configured to a low resolution (i.e., 7 bit resolution).

FIG. 6 shows the ADC configured to a low resolution (i.e., 7 bit resolution). In this embodiment, the analog input is directly applied to the 4th stage 314 of the pipeline system, bypassing the first 3 stages to reduce power consumption. Similarly, other parts of the remaining circuits of the ADC 300 are also being turned off by mode control 301. Therefore, the ADC power consumption is reduced and optimized ideally for low resolution. It is understood that by one of ordinary skill in the art although particular stages are turned off to provide decreased resolution, it is possible in other types of ADCs that portions of the ADC will be controlled (i.e., turned on or off) and that would be within the spirit and scope of the present invention.

Figure 7:
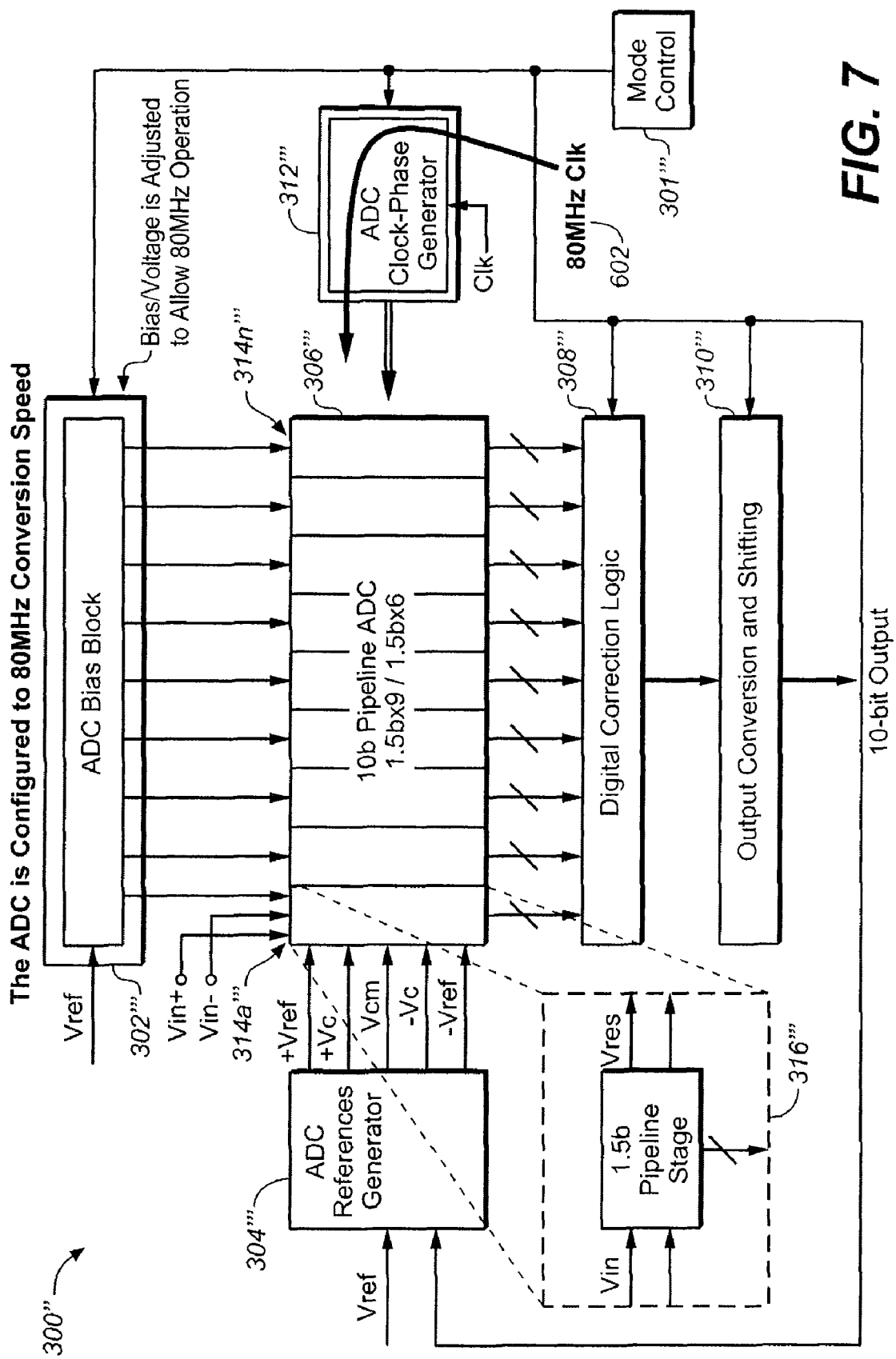
FIG. 7 shows the ADC configured for high speed operation (80 MHz).

In addition, the ADC 300 as before described could also be configured to operate at different speeds. FIG. 7 shows the ADC configured for high speed operation (80 MHz). If a high speed is required, the appropriate clock signals are delivered to the ADC 306'''. The bias block circuit 302 adjust via the mode control 301 the bias current and voltage to allow both analog and digital circuits to operate at the high speed.

Figure 8:
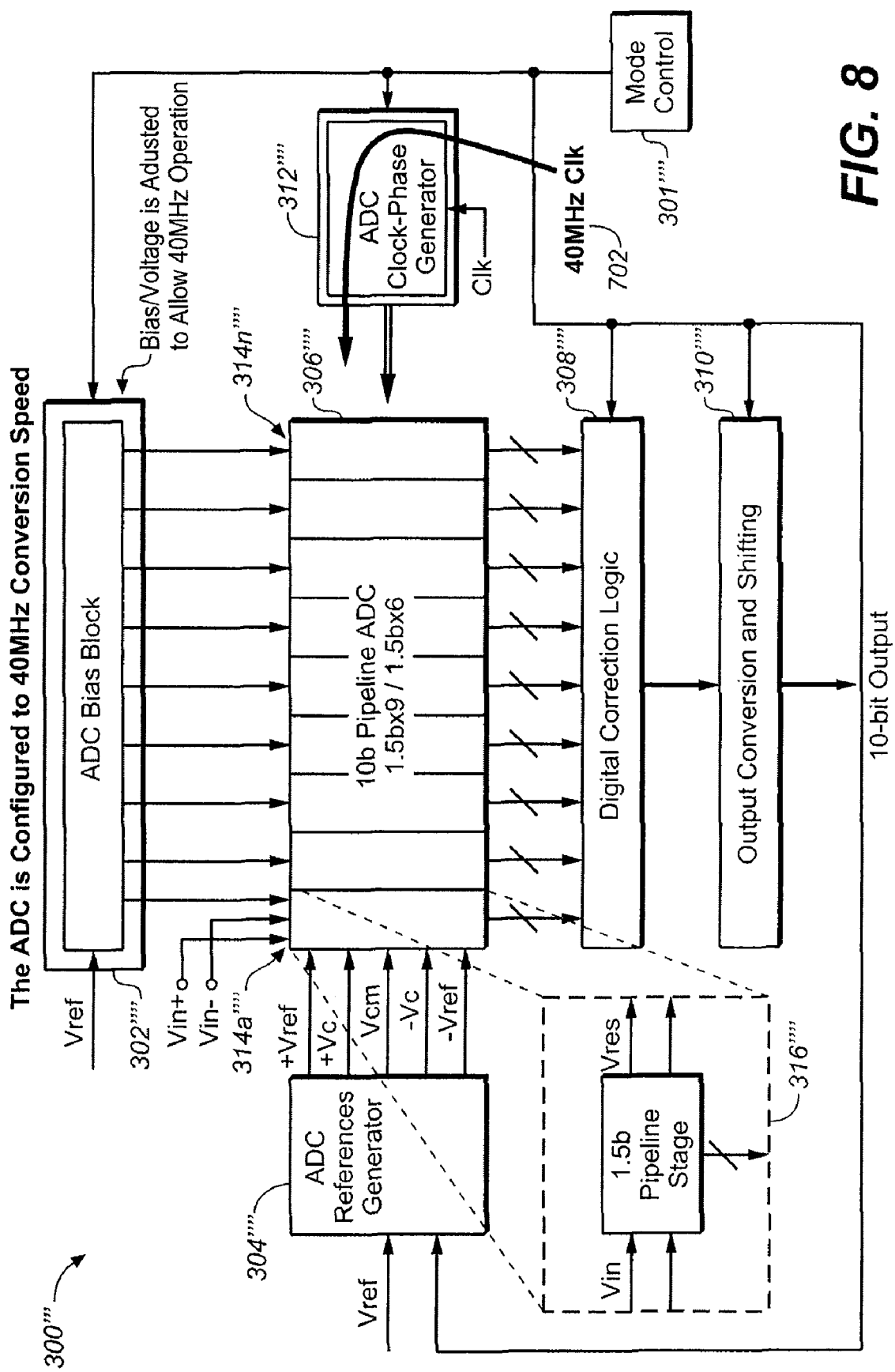
FIG. 8 shows the ADC configured for low speed operation (40 MHz).

FIG. 8 shows the ADC configured for low speed (40 MHz). If a low speed is required, the clock signal is reduced down and the bias block 312'''' adjusts the bias current/voltage via the mode control 301 to support a low speed operation. In this mode, the analog bias currents are reduced and the dynamic digital currents are also reduced. Therefore, the ADC power consumption is reduced and optimized ideally for a 40 MHz operation.

A wireless receiver with an adaptively configurable ADC for is provided. The speed and resolution the ADC is configurable depending on the operational mode of the receiver. Accordingly, through the use of an adaptively configurable ADC, power consumption and speed is optimized for each operational mode.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A circuit comprising:
   a controller; and
   an analog to digital converter (ADC) coupled to the controller, wherein the ADC includes at least a bias block circuit and a mode control unit,
   wherein in response to a high data rate, the ADC is configured instantly to a high speed mode by the bias block circuit adjusting, via the mode control unit, a bias current and voltage using a high rate clock signal, and the ADC is configured instantly to a high resolution mode by turning on all functions of the ADC,
   wherein in response to any of early data detection and a low data rate, the ADC is configured instantly to a low speed mode by the bias block circuit adjusting, via the mode control unit, the bias current and voltage using a low rate clock signal, and the ADC is configured instantly to a low resolution mode by turning off some functions of the ADC.

2. The circuit of claim 1, wherein the ADC comprises a plurality of ADCs and is configured by switching between each of the plurality of ADCs.

3. The circuit of claim 1, wherein the ADC is configurable to a plurality of configurable modes comprising resolution modes and speed modes.

4. The circuit of claim 3, wherein the resolution modes comprise a high resolution mode and a low resolution mode and the speed modes comprise a high speed mode and a low speed mode.

5. The circuit of claim 1, wherein the ADC comprises:
   a plurality of pipeline stages;
   a bias circuit coupled to the plurality of pipeline stages; and a clock circuit coupled to the plurality of pipeline stages, wherein when the voltage provided by the bias circuit is a first predetermined value and the clock frequency is at a second predetermined value, the ADC is in a high speed mode and when the voltage provided by the bias circuit is a third predetermined value and the clock frequency is at a fourth predetermined value the ADC is in a low speed mode.

6. The circuit of claim 5, wherein when all of the pipeline stages are on, the ADC is in high resolution mode and when at least one of the pipeline stages is off, the ADC is in low resolution mode.

7. A wireless receiver comprising:
an antenna;
a radio frequency integrated circuit to receive signals from the antenna;
a baseband integrated circuit coupled to the radio frequency circuit, the baseband integrated circuit comprising an analog to digital converter (ADC), wherein the ADC includes at least a bias block circuit and a mode control unit; and
a controller coupled to the ADC to receive signals from the ADC,
wherein in response to receiving a high data rate, the ADC is configured instantly to a high speed mode by the bias block circuit adjusting, via the mode control unit, a bias current and voltage using a high rate clock signal, and the ADC is configured instantly to a high resolution mode by turning on all functions of the ADC,
wherein in response to any of early data detection and a low data rate, the ADC is configured instantly to a low speed mode by the bias block circuit adjusting, via the mode control unit, the bias current and voltage using a low rate clock signal, and the ADC is configured instantly to a low resolution mode by turning off some functions of the ADC.

8. The wireless receiver of claim 7, wherein the ADC comprises a plurality of ADCs and is configured by switching between each of the plurality of ADCs.

9. The wireless receiver of claim 7, wherein the ADC is configurable to a plurality of configurable modes comprising resolution modes and speed modes.

10. The wireless receiver of claim 9, wherein the resolution modes comprise a high resolution mode and a low resolution mode and the speed modes comprise a high speed mode and a low speed mode.

11. The wireless receiver of claim 7, wherein the ADC is configured into a power saving mode during data detection.

12. The wireless receiver of claim 7, wherein the ADC comprises:
a plurality of pipeline stages;
a bias circuit coupled to the plurality of pipeline stages; and
a clock circuit coupled to the plurality of pipeline stages, wherein when the voltage provided by the bias circuit is a first predetermined value and the clock frequency is at a second predetermined value, the ADC is in a high speed mode and when the voltage provided by the bias circuit is a third predetermined value and the clock frequency is at a fourth predetermined value the ADO is in a low speed mode.

13. The wireless receiver of claim 12, wherein when all of the pipeline stages are on, the ADC is in high resolution mode and when at least one of the pipeline stages is off, the ADC is in low resolution mode.

* * * * *